United States Patent [19]

Wahl et al.

[11] 4,129,777
[45] Dec. 12, 1978

[54] CEMENT THICKNESS MEASUREMENTS IN CASED BOREHOLES

[75] Inventors: John S. Wahl, Ridgefield; Nick A. Schuster, Darien, both of Conn.

[73] Assignee: Schlumberger Technology Corporation, New York, N.Y.

[21] Appl. No.: 806,247

[22] Filed: Jun. 13, 1977

[51] Int. Cl.² .......................................... G01V 5/00
[52] U.S. Cl. ................................ 250/264; 250/266
[58] Field of Search ............... 250/264, 265, 266, 269

[56] References Cited

U.S. PATENT DOCUMENTS

| | | | |
|---|---|---|---|
| 3,976,879 | 8/1976 | Turcotte | 250/266 |
| 4,048,495 | 9/1977 | Ellis | 250/264 |

Primary Examiner—Davis L. Willis
Assistant Examiner—Janice A. Howell

[57] ABSTRACT

Methods and apparatus are provided for logging a borehole having solid matter along at least a portion of the wall thereof. Gamma radiation is emitted from the borehole into the surrounding media, and the amount of radiation which returns to the borehole is measured by three detectors located at different distances from the source of radiation, so as to be primarily sensitive to radiation which has respectively penetrated to three different depths in the surrounding media. The thickness of the solid matter on the borehole wall is then determined from the three gamma radiation measurements.

23 Claims, 3 Drawing Figures

CEMENT THICKNESS MEASUREMENTS IN CASED BOREHOLES

BACKGROUND OF THE INVENTION

The present invention relates to so-called gamma-gamma logging techniques for determining characteristics of earth formations surrounding boreholes by irradiation of the formations with gamma rays and detection of gamma rays that are scattered back to the borehole. More specifically, the invention concerns gamma-gamma logging methods and apparatus for determining the thickness of the media between a logging sonde and the surrounding earth formations.

As is well known in the well logging art, the density of earth formations surrounding a borehole can be measured by emitting gamma rays in the borehole from a collimated source contained within a logging sonde and detecting gamma rays that are scattered back to the borehole. As the gamma rays from the source interact principally with free or loosely bound electrons in the scattering medium, the amount of detected gamma radiation is related to the density of the medium, which can thus be determined.

One of the major problems encountered in gamma-gamma logging arises from the fact that the sonde is almost always separated from the adjacent formation by the mudcake present on the borehole wall or by a casing and the associated cement annulus. As the materials between the sonde and the formations are traversed twice by the gamma rays, the formation density measurements are strongly affected by the densities of these materials, which are generally different from the formation density.

To obtain more accurate formation density readings, it has been proposed to use two radiation detectors spaced at different distances from the gamma ray source. The near or short-spaced detector receives gamma rays which have diffused principally in the materials near the borehole wall. The far or long-spaced detector receives gamma rays which have diffused principally in the formation. Moreover, in order to eliminate the influence of the average atomic number of the elements in the scattering medium, the count rate of the detectors is measured in a restricted energy range covering only gamma rays which have been degraded by Compton effect. A value of uncompensated or apparent formation density is derived from the count rate of the far detector, and a density correction is computed using the two count rates. The density correction is then applied to the apparent density to obtain the true formation density. The technique is described in U.S. Pat. No. 3,321,625 issued on May 23, 1967 to J. Wahl and assigned to the assignee of the present invention.

It is easily conceivable that the above compensation technique provides an accurate correction of the formation density readings only as long as the near detector can "see" through the materials between the sonde and the formation. It would certainly be possible to make the near detector sensitive to gamma rays which have penetrated more deeply into the adjacent media by increasing the spacing between the source and the detector. However, the source-detector spacing must be kept reasonably low to permit statistically accurate measurements while the sonde is being moved through the borehole at a reasonable speed, without having to dangerously increase the strength of the source. For this reason, it is generally impossible to obtain a satisfactory correction, in uncased boreholes, for mudcake thicknesses exceeding 1.5 inches and, in cased boreholes, for cement thicknesses exceeding 1 inch. The mudcake thickness is generally lower than 1.5 inches, but the cement thickness often exceeds 1 inch. Therefore, it is desirable to obtain an indication of the thickness of the layer of cement or any other bonding material between the sonde and the formation for use as an index of the reliability of the corrected density readings.

Accordingly, it is a broad object of the present invention to provide gamma-gamma logging methods and apparatus for determining the thickness of the media between a logging sonde and the adjacent formations.

SUMMARY OF THE INVENTION

There is provided, in accordance with the present invention, methods and apparatus for logging a borehole having solid matter along at least a portion of the wall thereof. Gamma radiation is emitted from the borehole into the surrounding media, and measurements are taken of the amount of radiation which returns to the borehole as a result of the interaction of the emitted radiation with first, second and third layers respectively of the surrounding media, each beginning at the borehole and extending to increasing radial depths. These measurements can be taken by three detectors located at different spacings from the gamma radiation source so as to have three different depths of investigation. A representation of the thickness of the solid matter is then obtained from the three gamma radiation measurements.

A reasonably accurate thickness measurement will be obtained only if the solid matter of interest extends more deeply than the first layer but less deeply than the second layer. If the solid matter extends less deeply than the first layer or more deeply than the second layer, an accurate thickness measurement cannot be obtained. In that case, it will only be possible to determine that the thickness of the solid matter is below a lower limit or above an upper limit.

The invention is particularly useful for determining the thickness of the bonding material between a borehole casing and the adjacent formation. In that case, the three gamma radiation measurements, respectively called the shallow, intermediate and deep measurements, are first corrected for the attenuating effect of the casing. Three densities $d_S$, $d_I$ and $d_D$ are then computed from the corrected shallow, intermediate and deep radiation measurements respectively. An indication of the thickness of the bonding material is finally derived from the ratio $(d_D - d_I) / (d_I - d_S)$ by using an empirical relationship based on gamma-gamma measurements in formations of known densities with bonding materials of known densities and known thicknesses.

The density derived from the deep measurement can also be corrected, in accordance with the teaching of the aforementioned U.S. Pat. No. 3,321,625, by using the shallow or the intermediate measurement, in order to obtain an indication of the formation density.

In accordance with another aspect of the present invention, an indication of the density of the bonding material can then be obtained by deriving from the thickness measurement, through another empirical relationship, a representation of the ratio $(d - d_C) / (d_I - d_S)$, $d$ and $d_C$ being the density of the formation and the density of the bonding material respectively. Since $d$, $d_I$ and $d_S$ have already been determined, the density $d_C$ can then easily be obtained.

The present invention, both as to its organization and its manner of operation, together with further characteristics thereof, may best be understood by reference to the following description taken in conjunction with the accompanying drawings.

DESCRIPTION OF THE PREFERRED EMBODIMENT

Figure 1:
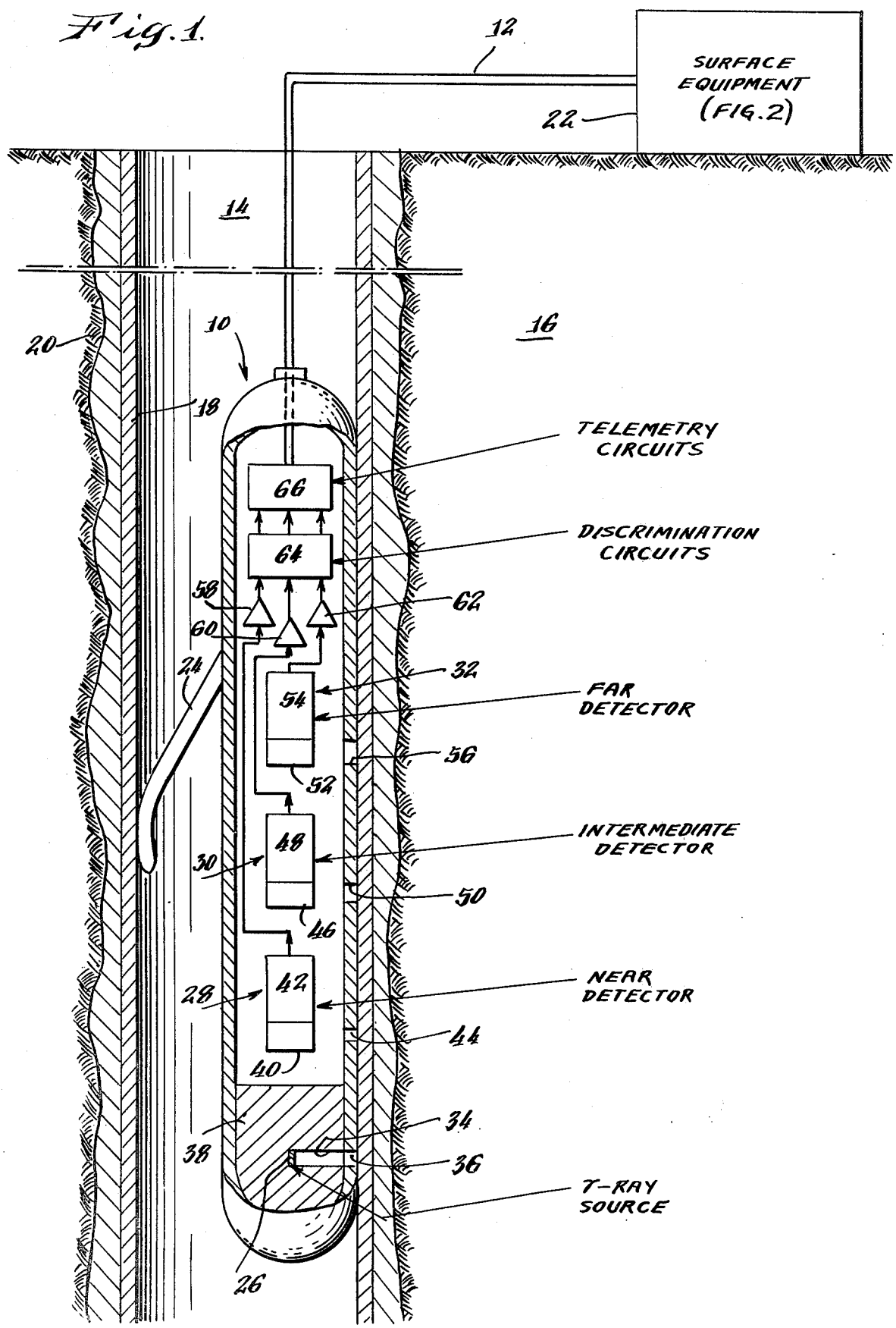
FIG. 1 is a cross-sectional representation of one embodiment of a logging apparatus in accordance with the present invention.

Referring to FIG. 1, a logging sonde is shown suspended by an armored cable 12 in a borehole 14 surrounded by earth formations 16. The borehole 14 is lined, in a conventional manner, with a steel casing 18, which is cemented in place by a layer of cement 20 or of any other appropriate bonding material, that also serves to prevent fluid communication between adjacent producing formations. The cable 12 contains insulated conductors which connect the components located within the sonde 10 to surface electronics equipment 22. The sonde 10 is urged against the casing 18 by a conventional eccentering means, such as a spring loaded hydraulic arm 24 or a bow spring.

The sonde 10 includes a gamma radiation source 26 emitting radiation into the adjacent formation and three gamma radiation detectors 28, 30 and 32 located at different distances from the source so as to principally receive gamma radiation returning to the sonde as a result of the interaction of the emitted radiation with three respective layers of the surrounding media, beginning at the borehole and extending to three different depths defined by the depths of investigation of the detectors. Detectors 28, 30 and 32, respectively called the near, intermediate and far detectors, are preferably located at 7, 12 and 16 inches respectively from the source. With such source-detector spacings, the depths of investigations of the detectors, measured from the outside surface of the casing, are approximately 1, 3.5 and 5.5 inches respectively. The near, intermediate and far detectors will therefore receive radiation which has interacted with three layers of the adjacent media extending to approximately 1, 3.5 and 5.5 inches respectively from the casing.

The source 26, preferably formed of cesium 137 emitting gamma rays of 662 keV, is disposed at the bottom of a collimation conduit 34 which passes through the wall of the sonde in contact with the casing and is substantially perpendicular to said wall. The conduit 34 is closed by a window 36 formed of a material transparent to gamma radiation such as an epoxy resin. A shielding material 38 of high density, such as tungsten, surrounds the conduit 34 to prevent any direct effect of the gamma radiation from the source on the detectors.

The near detector 28 includes a scintillator crystal 40, such as sodium iodide, optically coupled to a photomultiplier 42. The crystal 40 is located behind a collimation conduit 44 which is closed by a gamma ray transparent material. The intermediate detector 30 includes a scintillator crystal 46, optically coupled to a photomultiplier 48. The crystal 46 is located behind a gamma ray transparent window 50. In a similar way, the far detector 32 includes a scintillator crystal 52 optically coupled to a photomultiplier 54 and located behind a gamma ray transparent window 56.

The output pulses of photomultipliers 42, 48 and 54 are first amplified respectively in preamps 58, 60 and 62, before being applied to discrimination circuits 64, which transmit only pulses above a selected amplitude. The purpose of the amplitude discrimination is to eliminate pulses resulting from the detection of low energy gamma rays which reflect the average atomic number of the adjacent media. Typically, with a source of cesium 137, pulses from gamma rays having an energy lower than 150 keV are eliminated.

The outputs of discrimination circuits 64 are applied to the sonde telemetry circuits 66 that condition the selected pulses and transmit them to the surface equipment 22 through individual conductors in cable 12, each dedicated to a specific detector.

Instead of merely transmitting individual pulses to the surface, it is possible to accumulate the output pulses of the discrimination circuits in an appropriate memory unit within the sonde. Binary-coded count rates are then transmitted to the surface in a multiplexed fashion. One such technique is described in U.S. Pat. No. 4,012,712, issued Mar. 15, 1977 to W. B. Nelligan and assigned to the assignee of the present invention.

Figure 2:
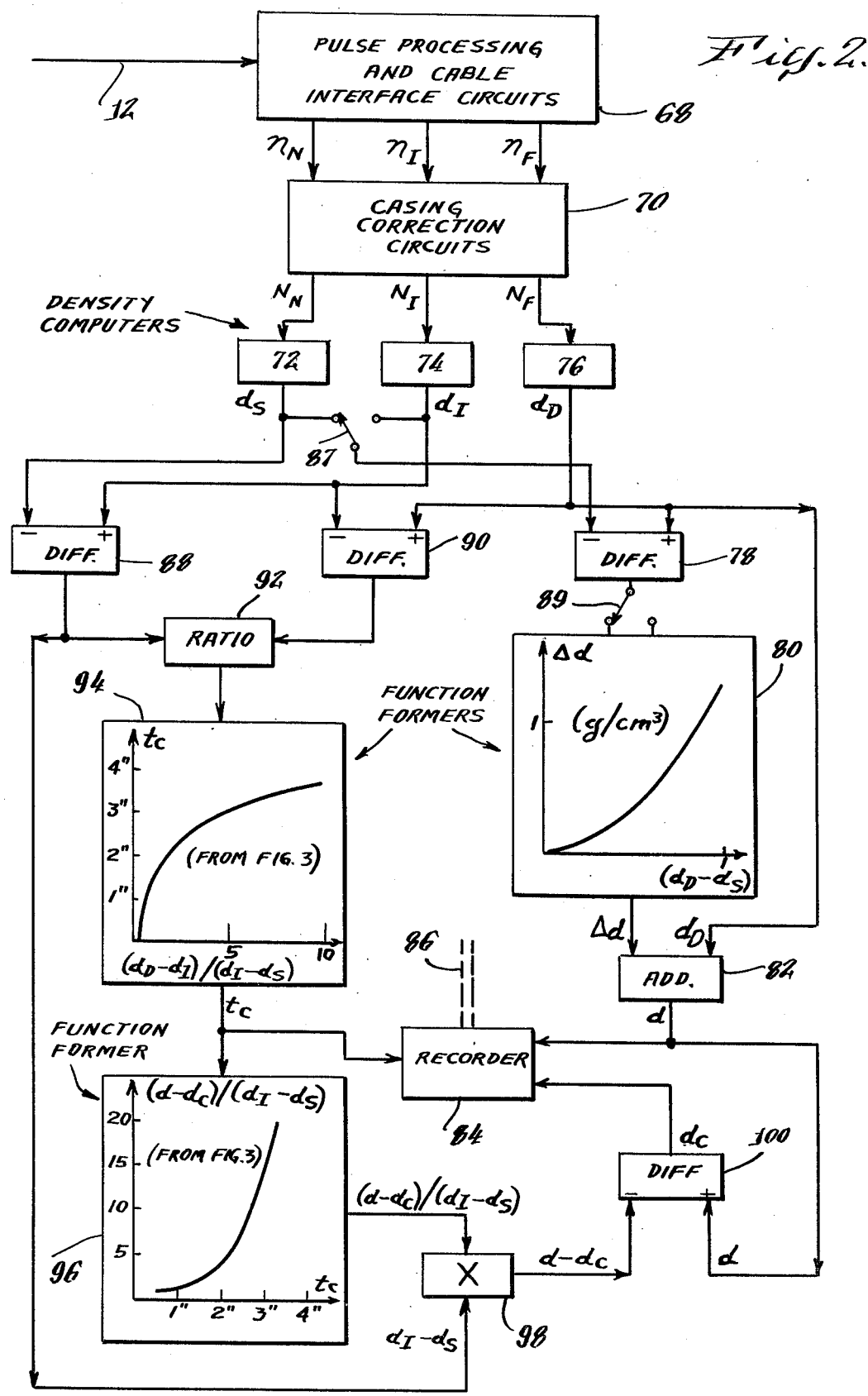
FIG. 2 is a schematic representation of the surface equipment in the apparatus of FIG. 1.

In the surface equipment 22, which is shown in FIG. 2, the pulses from the sonde are received by suitable pulse processing and cable interface circuits 68 which produce, on three distinct output terminals, signals varying in accordance with the counting rates $n_N$, $n_I$ and $n_F$ of the output pulses from the near, intermediate and far detectors respectively, as transmitted by the discrimination circuits 64. The counting rates $n_N$, $n_I$ and $n_F$, respectively called the shallow, intermediate and deep measurements, reflect approximately the amount of gamma radiation that returns to the sonde as a result of the interaction of the emitted radiation with three radial layers of the surrounding media, each beginning at the borehole and extending to three different radial depths corresponding to the depths of investigation of the three detectors.

The signals produced by the processing circuit 68 are applied to correction circuits 70 which, by the way of an appropriate amplification, compensate each signal for the attenuating effect of the casing, this effect being different for each detector. The correction circuits 70 preferably take the form of three variable gain amplifiers whose respective gains can be adjusted by the operator as a function of the thickness of the casing. As a result of such correction, the three signals produced by the correction circuits 70 vary in accordance with the shallow, intermediate and deep radiation measurements $N_N$, $N_I$ and $N_F$ which would be obtained if there were no casing.

The signals representing $N_N$, $N_I$ and $N_F$ are applied to three density computation stages 72, 74 and 76 respectively, which convert these signals into signals representing the shallow, intermediate and deep densities $d_S$, $d_I$ and $d_D$ respectively, calculated according to the general relationship:

$$N = N_o e^{-dx}$$

where:
  N is the measured count rate,
  $N_o$ is the initial intensity of the gamma radiation source, d is the density, and x is the average distance from the detector to the source.

The outputs of the density computers 72 and 76 are both coupled to a difference circuit 78 that produces an output signal representing the difference ($d_D - d_S$). This signal is applied to a function former 80 constructed to provide an input-to-output transfer characteristic that simulates the calibration function giving the density correction $\Delta d$ that must be applied to the deep density $d_D$ as a function of the difference ($d_D - d_S$) to obtain an indication of the true formation density in accordance with the teaching of the above-identified Wahl patent.

The calibration function is based on density readings in laboratory formations of high purity and accurately known densities. Such a function depends, of course, on each particular tool, but its general shape is that shown in the function former 80.

The output signal of the density computer 76, that represents the deep density $d_D$, and the output signal of the function former 80, that represents the density correction $\Delta d$ corresponding to the particular value of the difference ($d_D - d_S$), are applied to an addition circuit 82 that produces a signal representing the true formation density $d = d_D + \Delta d$. The density signal d is supplied to a trace recorder 84 which is driven as a function of depth by a shaft 86 actuated by the cable 12, in order to provide a formation density log.

Alternatively, the density correction $\Delta d$ can be computed from the difference ($d_D - d_I$) instead of the difference ($d_D - d_S$). A more reliable value of the formation density is obtained, in that case, when the cement thickness exceeds 1 inch. The surface equipment therefore advantageously includes a switch 87 allowing either the shallow density computer 72 or the intermediate density computer 74 to be coupled to the difference circuit 78.

When the density correction is derived from the difference ($d_D - d_I$), it is necessary, of course, to use another calibration function. The function former 80 therefore includes a second stage constructed to produce an output signal that represents the density correction $\Delta d$ corresponding to the particular value of the difference ($d_D - d_I$). A switch 89, that can be actuated in synchronism with the switch 87, allows the difference circuit 78 to be coupled to one or the other of the two stages of the function former 80.

The outputs of the density computers 72 and 74 are coupled to a difference circuit 88 that produces a signal representing the difference ($d_I - d_S$). The outputs of the density computers 74 and 76 are coupled to another difference circuit 90 that produces a signal representing the difference ($d_D - d_I$). The output signals of the difference circuits 88 and 90 are applied to a ratio circuit 92 that produces a signal representing the ratio ($d_D - d_I$) / ($d_I - d_S$).

Figure 3:
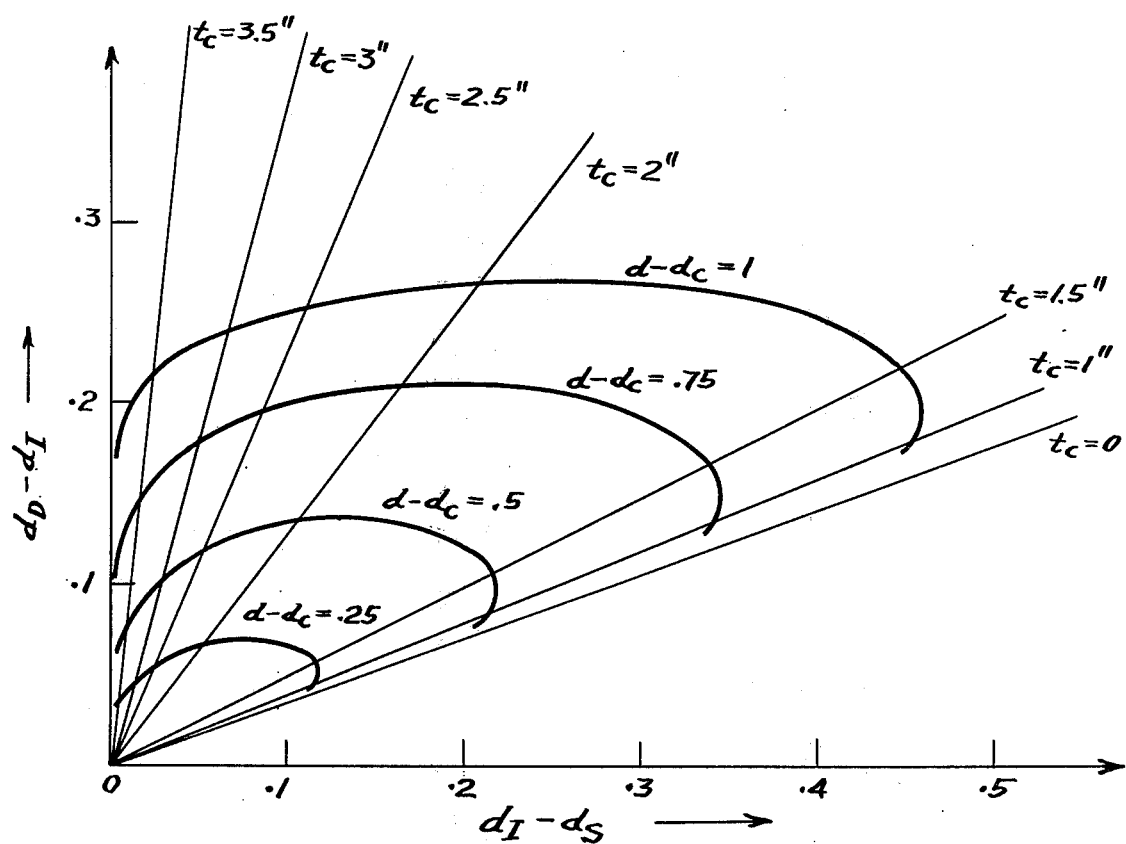
FIG. 3 is a graphical representation useful in explaining the invention.

Now referring to FIG. 3, it is shown how the output signal of the ratio circuit 92 can be used to obtain an indication of the thickness of the layer of bonding material between the casing and the formation. FIG. 3 represents the variation of the difference ($d_D - d_I$) as a function of the difference ($d_I - d_S$) for cement thicknesses $t_C$ ranging from 0 to 3.5 inches and density contrasts ($d - d_C$) between formation and cement varying from 0.25 to 1. The figure shows a diverging bundle of straight lines, one for each cement thickness, fanning out from the origin. A relationship exists therefore between the cement thickness $t_C$ and the slope of the straight lines, represented by the ratio ($d_D - d_I$) / ($d_I - d_S$). This relationship, shown in the function former 94 of FIG. 2, can be defined by the equation:

$$t_c = A \left( \frac{d_D - d_I}{d_I - d_S} - B \right)^C,$$

where A, B and C are constants depending on a number of factors such as source strength, source-detector spacings, and sensitivity of the detectors. For the above-described tool, A = 1.73, B = 0.35 and C = 0.36.

The curve repesented in function former 94 shows that a measurement of the cement thickness can be obtained if the cement layer is no more than 3.5 inches thick, this value corresponding to the depth of investigation of the intermediate detector. For cement layers less than 1 inch thick, the resolution is relatively poor. This corresponds to the region in which all three detectors see through the cement and are therefore sensitive to cement thickness variations. For cement layers between 1 and 3.5 inches thick, the near detector cannot see through the cement, but the intermediate and far detectors still see through the cement. A good sensitivity to cement thickness variations is therefore obtained. When the cement thickness exceeds 3.5 inches, the intermediate detector becomes unable to see through the cement, and an accurate thickness measurement cannot be obtained.

It now becomes apparent that with the method of the invention, a reasonably accurate thickness measurement is obtained if the cement layer extends to a depth between the depths of investigation of the near and intermediate detectors. If the cement layer extends less deeply than the layer investigated by the near detector or more deeply than the layer investigated by the intermediate detector, an accurate thickness measurement cannot be obtained. In that case, it is only possible to determine that the cement thickness is below a lower limit, corresponding to the depth of investigation of the near detector, or above an upper limit, corresponding to the depth of investigation of the intermediate detector. The range of validity of the method can therefore be adjusted by appropriately selecting the source-detector spacings.

Returning now to FIG. 2, the output of the division circuit 92 is coupled to the function former 94, which provides an input-to-output transfer characteristic simulating the represented relationship for the considered tool. The function former 94, therefore, produces a signal that represents the cement thickness $t_C$ corresponding to the particular value of the ratio ($d_D - d_I$) / ($d_I - d_S$) determined by the division circuit 92. The output signal of the function former 94 is sent to the trace recorder 84 in order to provide a cement thickness log.

Now referring again to FIG. 3, it can be seen that, when the cement thickness $t_C$ and the formation density d are known, it becomes possible to obtain an indication of the cement density $d_C$. For example, it can easily be shown that, for a given cement thickness $t_C$, the ratio ($d - d_C$) / ($d_I - d_S$) remains substantially constant. The relationship between $t_C$ and the ratio ($d - d_C$) / ($d_I - d_S$) is represented in the function-former 96 of FIG. 2. This relationship can be defined by the equation:

$$\frac{d - d_C}{d_I - d_S} = D \cdot t_C^E,$$

where D and E are constants depending on each particular tool. For the above-described tool, D = 0.93 and E = 2.48. Such a relationship can advantageously be used to obtain the cement density $d_C$.

Now returning to FIG. 2, the output signal of the function former 94, which is representative of the cement thickness $t_C$, is applied to the function former 96 that provides an input-to-output transfer characteristic simulating the represented relationship. The function former 96 therefore produces an output signal that represents the ratio $(d - d_C) / (d_I - d_S)$ corresponding to the particular value of the cement thickness $t_C$. The output of the function former 96 and the output of the difference circuit 88, representing the difference $(d_I - d_S)$, are applied to a multiplication circuit 98 that produces a signal representing the difference $(d - d_C)$. This signal is applied to a difference circuit 100 that also receives, from the addition circuit 82, the signal representing the formation density d. The difference circuit 100 therefore produces a signal representing the cement density $d_C$ which is sent to the trace recorder 84 in order to provide a cement density log.

In operation, as the sonde 10 is advanced through the borehole 14, the trace recorder 84 simultaneously provides:

a log of the formation density d,
a log of the cement thickness $t_C$, and
a log of the cement density $d_C$.

The log of the cement thickness can be used as an index of the reliability of the formation density log. As long as the cement thickness does not exceed 1 inch, the formation density reading can be considered as reflecting the true porosity of the formation. A cement thickness reading higher than 1 inch is an indication that the density derived from the count rate of the far detector has not been accurately compensated for the effect of the cement layer.

The function formers 80, 94 and 96 could take the form of operational amplifiers having resistor-diode networks in the individual amplifier feedback circuits. The gain adjustment provided by these feedback resistances enables the amplifiers to provide the desired input-to-output transfer characteristics. These function formers could also take the form of microprocessors or a programmed general purpose computer such as the Digital Equipment Corporation PDP-11.

While there has been described what is at present considered to be a preferred embodiment of this invention, it will be obvious to those skilled in the art that various changes and modifications may be made within the spirit and scope of the invention. For example, digital circuits or a combination of digital and analog circuits could be used in accordance with the invention to produce the results described therein.

We claim:

1. A method for logging a borehole traversing an earth formation and having solid matter along at least a portion of the wall thereof, comprising the steps of:
   emitting gamma radiation from the borehole into the surrounding media;
   detecting gamma radiation which returns to the borehole as a result of the interaction of the emitted radiation with three respective radial layers of the surrounding media, each beginning approximately at the borehole and extending to different radial depths; and
   obtaining from the detected radiation a representation of the thickness of said solid matter.

2. The method of claim 1, further comprising determining from the detected radiation the density of said earth formation.

3. The method of claim 1, further comprising determining from the detected radiation the density of said solid matter.

4. A method for determining a characteristic of the solid matter between an earth formation traversed by a borehole and a logging sonde in said borehole emitting gamma radiation into the surrounding media, comprising the steps of:
   producing first, second and third measurements of the amount of gamma radiation that returns to the borehole as a result of the interaction of the emitted radiation with first, second and third radial layers respectively of the surrounding media, each beginning approximately at the borehole and extending to increasing radial depths; and
   obtaining from said measurements a representation of the thickness of said solid matter.

5. The method of claim 4, wherein said obtaining step comprises the steps of:
   producing first, second and third density measurements from said first, second and third gamma radiation measurements respectively; and
   combining said density measurements to obtain said thickness representation.

6. The method of claim 5, wherein said combining step comprises:
   computing the ratio of the difference between the third and second density measurements to the difference between the second and first density measurements; and
   deriving said thickness representation from said ratio.

7. A method for determining a characteristic of the bonding material between an earth formation traversed by a borehole in which gamma radiation is emitted into the surrounding media and a casing that lines the borehole, comprising the steps of:
   producing first, second and third measurements of the amount of gamma radiation that returns to the borehole as a result of the interaction of the emitted radiation with first, second and third radial layers respectively of the surrounding media, each beginning at the borehole and extending to increasing radial depths; and
   obtaining from said measurements a representation of the thickness of said bonding material.

8. The method of claim 7, wherein said obtaining step comprises the steps of:
   correcting said first, second and third measurements for the attenuating effect of the casing;
   producing first, second and third density measurements from the first, second and third corrected gamma radiation measurements, respectively; and
   combining said density measurements to obtain said thickness representation.

9. The method of claim 8, wherein said combining step comprises:
   computing the ratio of the difference between the third and second density measurements to the difference between the second and first measurements; and
   deriving said thickness representation from said ratio.

10. The method of claim 8, further comprising the step of producing a representation of the formation density from the third density measurement and one of the first and second density measurements.

11. The method of claim 10, wherein said producing step comprises:
deriving a density correction from the difference between said third density measurement and one of said first and second density measurements; and
combining said density correction with said third density measurement to obtain said formation density representation.

12. The method of claim 10, further comprising the step of obtaining a representation of the density of the bonding material from said formation density representation, said thickness representation and two of said first, second and third density measurements.

13. The method of claim 12, wherein said step of obtaining a representation of the bonding material density comprises:
deriving from the thickness representation of a representation of the ratio of the difference between the formation density and the bonding material density to the difference between the second and first density measurements; and
deriving said bonding material density representation from said ratio representation.

14. An apparatus for logging the media surrounding a borehole that traverses earth formations and has solid matter along at least a portion of its wall, comprising:
means for emitting gamma radiation from the borehole into the surrounding media;
means for producing first, second and third measurements of the amount of gamma radiation that returns to the borehole as a result of the interaction of the emitted radiation with first, second and third layers respectively of the surrounding media, each beginning approximately at the borehole and extending to increasing radial depths; and
means for obtaining a representation of the thickness of said solid matter from the detected radiation.

15. The apparatus of claim 14, wherein said producing means comprises three gamma radiation detectors located at different distances from said emitting means.

16. The apparatus of claim 14, wherein said obtaining means comprises:
means for producing first, second and third density measurements from said first, second and third gamma radiation measurements, respectively; and
means for combining said density measurements to obtain said thickness representation.

17. An apparatus for determining a characteristic of the bonding material between an earth formation traversed by a borehole in which gamma radiation is emitted into the surrounding media and a casing that lines the borehole, comprising:
means for producing first, second and third measurements of the amount of gamma radiation that returns to the borehole as a result of the interaction of the emitted radiation with first, second and third layers respectively of the surrounding media, each beginning at the borehole and extending to increasing radial depths; and
means for obtaining from said measurements a representation of the thickness of said bonding material.

18. The apparatus of claim 17, wherein said obtaining means comprises:
means for correcting said first, second and third measurements for the attenuating effect of the casing;
means for producing first, second and third density measurements from the first, second and third corrected gamma radiation measurements, respectively; and
means for combining said density measurements to obtain said thickness representation.

19. The apparatus of claim 18, wherein said combining means comprises:
means for computing the ratio of the difference between the third and second density measurements to the difference between the second and first measurements; and
means for deriving said thickness representation from said ratio.

20. The apparatus of claim 18, further comprising means for producing a representation of the formation density from the third density measurement and one of the first and second density measurements.

21. The apparatus of claim 20, wherein said producing means comprises:
means for deriving a density correction from the difference between said third density measurement and one of said first and second density measurements; and
means for combining said density correction with said third density measurement to obtain said formation density representation.

22. The apparatus of claim 20, further comprising means for obtaining a representation of the density of the bonding material from said formation density representation, said thickness representation and two of said first, second and third density measurements.

23. The apparatus of claim 22 wherein said means for obtaining a representation of the bonding material density comprises:
means for deriving from the thickness representation a representation of the ratio of the difference between the formation density and the bonding material density to the difference between the second and first density measurements; and
means for deriving said bonding material density indication from said ratio representation.

* * * * *